United States Patent [19]
Futamura et al.

[11] Patent Number: 6,077,188
[45] Date of Patent: Jun. 20, 2000

[54] LOCK-UP CONTROL METHOD OF AUTOMATIC TRANSMISSION

[75] Inventors: Suguru Futamura, Toyokawa; Masato Shimei, Nagoya, both of Japan

[73] Assignee: Aisin Seiki Kabushiki Kaisha, Kariya, Japan

[21] Appl. No.: 09/201,836

[22] Filed: Dec. 1, 1998

[30] Foreign Application Priority Data

Dec. 1, 1997  [JP]  Japan .................................. 9-330454
Dec. 26, 1997 [JP]  Japan .................................. 9-359874

[51] Int. Cl.$^7$ .................................................. F16H 61/14
[52] U.S. Cl. .............................................. 477/65; 477/78
[58] Field of Search ....................................... 477/65, 78

[56] References Cited

U.S. PATENT DOCUMENTS

| | | | |
|---|---|---|---|
| 4,953,091 | 8/1990 | Baltusis et al. .................. | 192/3.31 |
| 5,010,990 | 4/1991 | Yoshimura et al. ............... | 192/3.3 |
| 5,035,308 | 7/1991 | Baba et al. ....................... | 192/3.3 |
| 5,291,979 | 3/1994 | Iizuka .............................. | 192/3.3 |
| 5,573,473 | 11/1996 | Asayama et al. ................. | 477/63 |
| 5,580,331 | 12/1996 | Shiraishi et al. ................. | 477/109 |
| 5,722,912 | 3/1998 | Narita .............................. | 477/64 |
| 5,733,223 | 3/1998 | Matsubara et al. ............... | 477/175 |
| 5,807,209 | 9/1998 | Matsubara et al. ............... | 477/176 |

FOREIGN PATENT DOCUMENTS 63-88372  4/1988  Japan .
3-199768  8/1991  Japan .

*Primary Examiner*—Dirk Wright
*Attorney, Agent, or Firm*—Burns, Doane, Swecker & Mathis, LLP

[57] ABSTRACT

A lock-up control method of an automatic transmission for making the optimum lock-up control correspond to a shift control. In the lock-up control method of the automatic transmission in which the fastening force of a lock-up clutch is temporarily dropped to cause the lock-up clutch to slip in shifting the automatic transmission, the maximum value of a rate of change of speed of an input element is found while shifting the automatic transmission, the fastening force of the lock-up clutch is corrected so that a deviation between the maximum value and a target rate of change of speed of the input element is zeroed and the lock-up clutch is fastened by the corrected fastening force in the next shift.

5 Claims, 19 Drawing Sheets

Fig. 2

|  |  | C0 | C1 | C2 | B0 | B1 | B2 |
|---|---|---|---|---|---|---|---|
| P RANGE | | ○ | × | × | × | × | × |
| R RANGE | | ○ | × | ○ | × | × | ○ |
| N RANGE | | ○ | × | × | × | × | × |
| D RANGE | FIRST | ○ | ○ | × | × | × | × |
| | SECOND | × | ○ | × | × | ○ | × |
| | THIRD | ○ | ○ | ○ | × | × | × |
| | FOURTH (O/D) | × | ○ | ○ | ○ | × | × |
| 2 RANGE | FIRST | ○ | ○ | × | × | × | × |
| | SECOND | ○ | ○ | × | × | ○ | × |
| L RANGE | | ○ | ○ | × | × | × | ○ |

Fig. 7

$\Delta$Nem (TARGET VALUE OF $\Delta$Ne)

| No (SPEED OF OUTPUT SHAFT) | TY | |
|---|---|---|
| | 4→3 | 3→2 |
| No ≦ 1500 | $\Delta$Ne 41 | $\Delta$Ne 31 |
| 1500 < No ≦ 2000 | $\Delta$Ne 42 | $\Delta$Ne 32 |
| 2000 < No ≦ 3000 | $\Delta$Ne 43 | $\Delta$Ne 33 |
| 3000 < No ≦ 4000 | $\Delta$Ne 44 | $\Delta$Ne 34 |
| 4000 < No | $\Delta$Ne 45 | $\Delta$Ne 35 |

Fig. 12

CORRECTING AMOUNT $\alpha, \beta$

| | $C \leq 0$ | $0 < C \leq 25$ | $25 < C \leq 50$ | $50 < C \leq 100$ |
|---|---|---|---|---|
| CORRECTING AMOUNT $\alpha$ | $\alpha 1$ | $\alpha 2$ | $\alpha 3$ | $\alpha 4$ |
| CORRECTING AMOUNT $\beta$ | $\beta 1$ | $\beta 2$ | $\beta 3$ | $\beta 4$ |

| | $100 < C \leq 150$ | $150 < C \leq 200$ | $200 < C \leq 250$ | $250 < C \leq 300$ |
|---|---|---|---|---|
| CORRECTING AMOUNT $\alpha$ | $\alpha 5$ | $\alpha 6$ | $\alpha 7$ | $\alpha 8$ |
| CORRECTING AMOUNT $\beta$ | $\beta 5$ | $\beta 6$ | $\beta 7$ | $\beta 8$ |

Fig. 18

| No(IN OUTPUTTING SHIFT) | No1<No≦No2 | No2<No≦No3 | No3<No≦No4 |
|---|---|---|---|
| ΔNet | ΔNet | ΔNet | ΔNet |

Fig. 19

| No (IN OUTPUTTING SHIFT) | | | | | | |
|---|---|---|---|---|---|---|
| No1 < No ≦ No2 | | No2 < No ≦ No3 | | No3 < No ≦ No4 | |
| e | ΔD | e | ΔD | e | ΔD |
| e2 < e ≦ e3 | ΔD1 | e2 < e ≦ e3 | ΔD6 | e2 < e ≦ e3 | ΔD11 |
| e1 < e ≦ e2 | ΔD2 | e1 < e ≦ e2 | ΔD7 | e1 < e ≦ e2 | ΔD12 |
| 0 | ΔD3 | 0 | ΔD8 | 0 | ΔD13 |
| e4 < e ≦ e5 | ΔD4 | e4 < e ≦ e5 | ΔD9 | e4 < e ≦ e5 | ΔD14 |
| e5 < e ≦ e6 | ΔD5 | e5 < e ≦ e6 | ΔD10 | e5 < e ≦ e6 | ΔD15 |

LOCK-UP CONTROL METHOD OF AUTOMATIC TRANSMISSION

This application corresponds to Japanese Application No. 9-(1997)-330454 filed on Dec. 1, 1997 and Japanese Application No. 9-(1997)-359874 filed on Dec. 26, 1997, the entire content of both of which is incorporated herein by reference.

FIELD OF THE INVENTION

The present invention generally relates to an automatic transmission. More particularly, the present invention pertains to a lock-up control method of an automatic transmission for controlling the fastening force of a lock-up clutch in shifting the automatic transmission.

BACKGROUND OF THE INVENTION

One method for controlling a lock-up clutch is disclosed in Japanese Patent Laid-Open No. 63-88372. According to the control method disclosed in this publication, the engaging force of the lock-up clutch is temporarily dropped to put the lock-up clutch in a slipping state in shifting a transmission when the lock-up clutch contained in a torque converter is directly coupled.

The method for controlling the lock-up clutch disclosed in the abovementioned publication allows a reduction in the shift shock occurring in shifting the transmission as compared to when the lock-up clutch is kept completely engaged. This also allows suppression of the number of times of engagement of the lock-up clutch, thus preventing busy shift, as compared to when the lock-up clutch is completely engaged after completing the shift by completely releasing the lock-up clutch until when the shift is completed in shifting the transmission.

Also, the lock-up hydraulic pressure deciding the slip amount of the lockup clutch is controlled by a control method (open loop) decided by the current shift stage, the car speed and the throttle opening angle. This can thus possibly cause abrupt changes in the engine speed (e.g., blow-up of an engine in shifting down the transmission) due to an excessive slip of the lock-up clutch or can cause a shift shock due to insufficient slip of the lock-up clutch caused by variations in the performance of the lock-up clutch itself (including an elapsed change), variations in the use conditions (e.g., viscosity of operating fluid), etc.

Japanese Patent Laid-Open No. Hei. 3-199768 also discloses technology related to a lock-up control method. This publication discloses a technique of releasing (turning off) the lock-up clutch in shifting to the lower speed stage during running while decelerating the speed. However, problems have arisen in that in a vehicle fitted with an exhaust brake, the effect of the exhaust brake drops as the lockup clutch is released, thus causing a sense of idle running. Also, the number of times of engagement and release of the lock-up clutch increases, thus increasing the sense of busy shifting and dropping the shifting feeling, by releasing the lockup clutch during shifting of the transmission.

In light of the foregoing, a need exists for a lock-up control method of an automatic transmission for making the optimum lock-up control correspond to a shift control.

SUMMARY OF THE INVENTION

In accordance with the present invention, a lock-up control method of an automatic transmission in which the fastening force of a lock-up clutch is temporarily dropped to cause the lock-up clutch to slip in shifting the automatic transmission when the lock-up clutch contained in a torque converter is directly coupled involves correcting the fastening force of the lockup clutch so that the rate of change of the engine speed in shifting the transmission is changed to a desired rate of change.

BRIEF DESCRIPTION OF DRAWING FIGURES

Additional features and characteristics of the present invention will become more apparent from the following detailed description considered with reference to the accompanying drawing figures in which like elements are designated by like reference numerals and wherein:

FIG. 2 is a table showing actuation of the hydraulic clutches and hydraulic brakes of the automatic transmission system shown in FIG. 1;

FIG. 7 is a table showing the contents of a target rate of change of engine speed map that is stored in a memory of the electronic control unit shown in FIG. 1 used in implementing the first embodiment of the present invention;

FIG. 12 is a table showing the contents of a correcting amount map that is stored in the memory of the electronic control unit used in implementing the second embodiment of the present invention;

FIG. 18 is a table showing the contents of a target rate of change ΔNet map stored in the memory of the electronic control unit used in implementing the third embodiment of the present invention; and FIG. 19 is a table showing the contents of a correcting amount ΔD of duty ratio map that is stored in the memory of the electronic control unit used in implementing the third embodiment of the present invention.

DETAILED DESCRIPTION OF THE PREFERRED EMBODIMENTS

Figure 1:
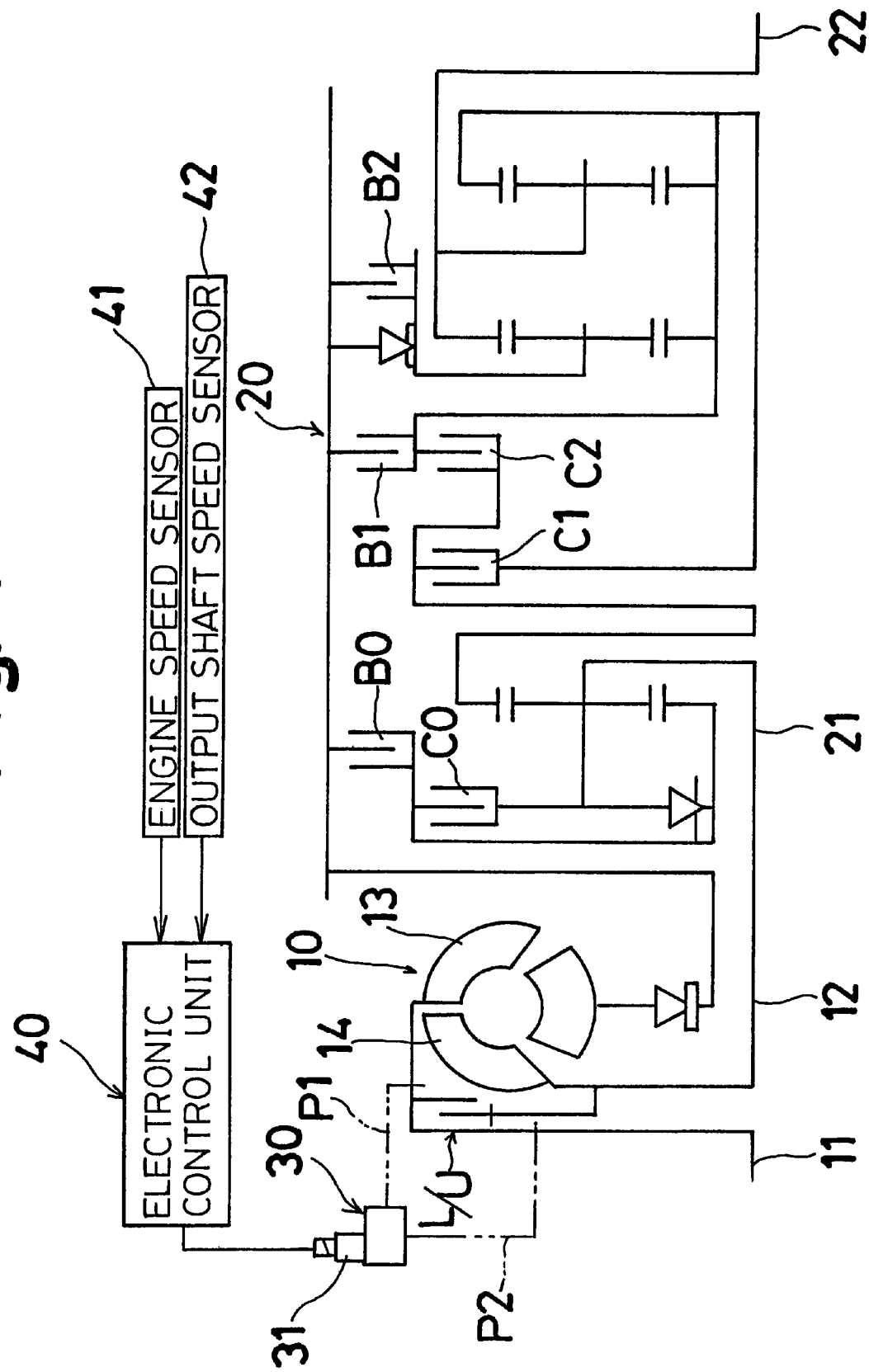
FIG. 1 is a hydraulic control circuit diagram schematically showing various parts of a vehicular automatic transmission system, including a torque converter, a transmission, a lock-up hydraulic control unit, and an electronic control unit.

With reference initially to FIG. 1, a first embodiment of the vehicular automatic transmission system of the present invention includes a torque converter 10, a transmission 20, and a lock-up hydraulic control unit 30 for controlling the operation of a lock-up clutch L/U contained in the torque converter 10 of the vehicular automatic transmission system. The lock-up hydraulic control unit 30 is controlled by an electronic control unit 40 based on the output signals of an engine speed sensor 41 and an output shaft speed sensor 42. The engine speed sensor 41 detects the number of revolutions of the engine output shaft connected to an input shaft 11 of the torque converter 10, and the output shaft speed sensor 42 detects the number of revolutions of an output shaft 22 of the transmission 20. The output shaft 12 of the torque converter 10 and the input shaft 21 of the transmission 20 are coupled so as to rotate together as a unit.

The lock-up clutch L/U is a hydraulic clutch which can directly couple a pump 13 which is an inputting element of the torque converter 10 and a turbine 14 which is an outputting element of the torque converter 10. Torque converter pressure Lu which is governed to be always constant by a governor valve of the lock-up hydraulic control unit 30 is applied to an engaging side oil path P1, and lock-up pressure Tc controlled by an electromagnetic valve 31 of the lock-up hydraulic control unit 30 is applied to a releasing side oil path P2 so that there occurs a slip (a difference between the speeds of the pump 13 and the turbine 14) of the lock-up clutch L/U corresponding to a difference between the torque converter pressure Lu and the lock-up pressure Tc. The electronic control unit 40 controls the duty of the electromagnetic valve 31 of the lock-up hydraulic control unit 30 and the electromagnetic valve 31 controls the lock-up pressure Tc. The electronic control unit 40 is provided with a program (corresponding to the flowcharts in FIGS. 3–5 and executed per every preset time) for controlling the operation of the electromagnetic valve 31 of the lock-up hydraulic control unit 30 and the shifting operation of the transmission 20.

The transmission 20 is a transmission having four forward stages and one reverse stage and is provided with a shift hydraulic control unit that is controlled by the electronic control unit 40, and three hydraulic clutches C0, C1, C2 and three hydraulic brakes B0, B1, B2 controlled by the shift hydraulic control unit. The respective hydraulic clutches C0, C1, C2 and the hydraulic brakes B0, B1, B2 are controlled by the shift hydraulic control unit corresponding to respective shift ranges P, R, N, D, 2 and L selected by the driver through the manipulation of a shift lever and to the driving condition of the vehicle as shown in FIG. 2. The table shown in FIG. 2 illustrates the actuation of the clutches and brakes, with the designations "O" indicating engaged states when the actuation of the clutches and brakes is ON and the designations "X" indicating released states when the actuation of the clutches and brakes is OFF.

With reference to the flowcharts shown in FIGS. 3–5 and the timing chart shown in FIG. 6, the operation of the lock-up clutch L/U in shifting the transmission 20 (e.g., in shifting down from the third speed to the second speed) when the lock-up clutch L/U contained in the torque converter 10 is directly coupled will be explained. In FIG. 6, the characteristic curve indicated by a broken line in the graph of engine speed Ne represents when the duty ratio is 100% and the rate of slip of the torque converter is 1.

Figure 3:
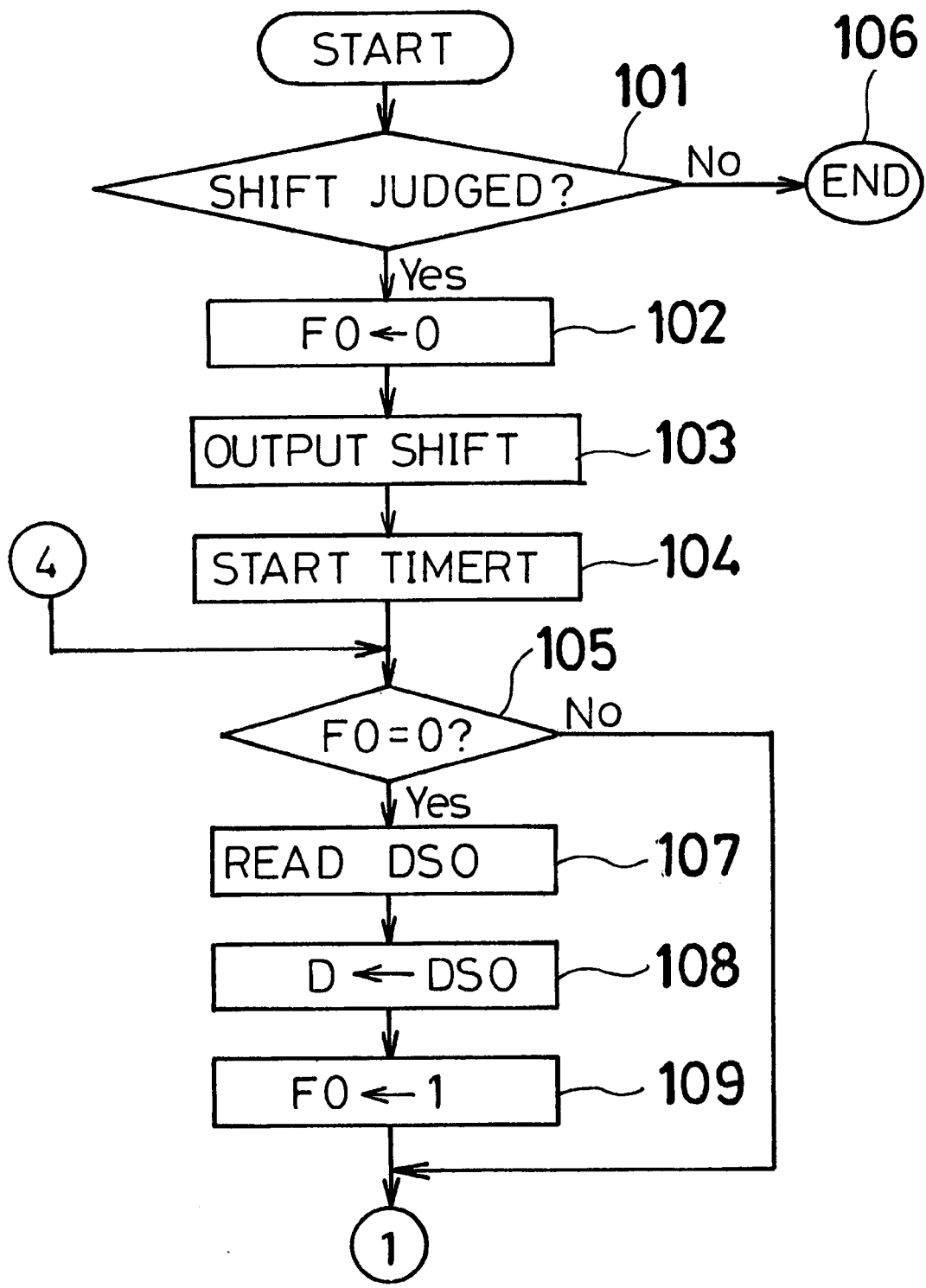
FIG. 3 is a flowchart showing a part of a program executed by the electronic control unit shown in FIG. 1 in accordance with a first embodiment of the present invention.

Turning first to FIG. 3, it is determined in Step 101 whether or not a shift should be made and when it is determined to be "YES", Steps 102, 103, 104 and 105 are executed successively. When it is determined to be "NO" in Step 101, Step 106 is executed to end the execution of the program.

A flag F0 is set to "0" in Step 102, and then in Step 103 the shift is outputted, e.g., a shift-down signal from third to second is outputted. A timer T starts to count time in Step 104 and it is then determined in Step 105 whether or not the flag F0=0. When it is determined to be "YES" in Step 105, Steps 107, 108 and 109 in FIG. 3, and Step 110 in FIG. 4 are executed successively. When the determination in Step 105 is "NO", the process jumps to and executes Step 110 in FIG. 4.

An initial value DSO of the duty ratio stored in advance is read in Step 107, the duty ratio D is set at the initial value DSO in Step 108, and the flag F0 is set to "1" in Step 109. In Step 110 of FIG. 4, it is determined whether or not a measured value of the timer T (i.e., an elapsed time after the output of the shift) has reached a preset value T3. That is, it is determined whether or not the timer T is greater than or equal to T3. When it is determined to be "YES" in Step 110, Step 111 is executed and when it is determined to be "NO" in Step 110, the process jumps to Step 119 in FIG. 5. The above-mentioned preset time T3 is decided such that the point of time of T3 comes behind a shift starting point (when the engine speed starts to increase by shifting down from third to second) based on actually measured values from the output of the shift to the shift starting point as shown in FIG. 6.

Figure 4:
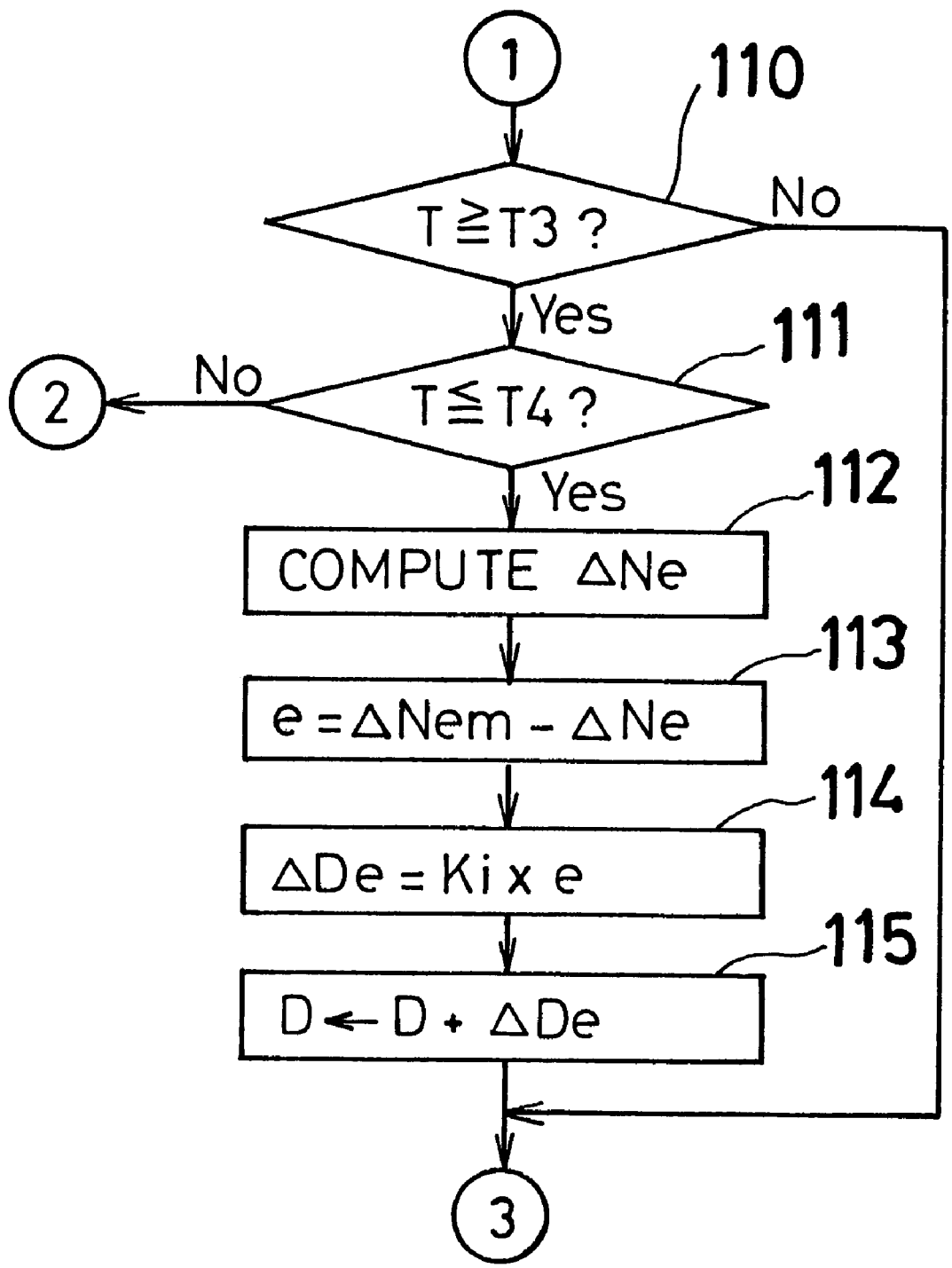
FIG. 4 is a flowchart showing another part of the program executed by the electronic control unit shown in FIG. 1.

In Step 111 of FIG. 4, a determination is made concerning whether or not the measured value of the timer T (i.e., the elapsed time after the output of the shift) has reached a preset time T4. That is, it is determined whether the timer T is less than or equal to T4. When it is determined to be "YES" in Step 111, Steps 112, 113, 114, 115 in FIG. 4 and Step 119 in FIG. 5 are executed successively.

Figure 5:
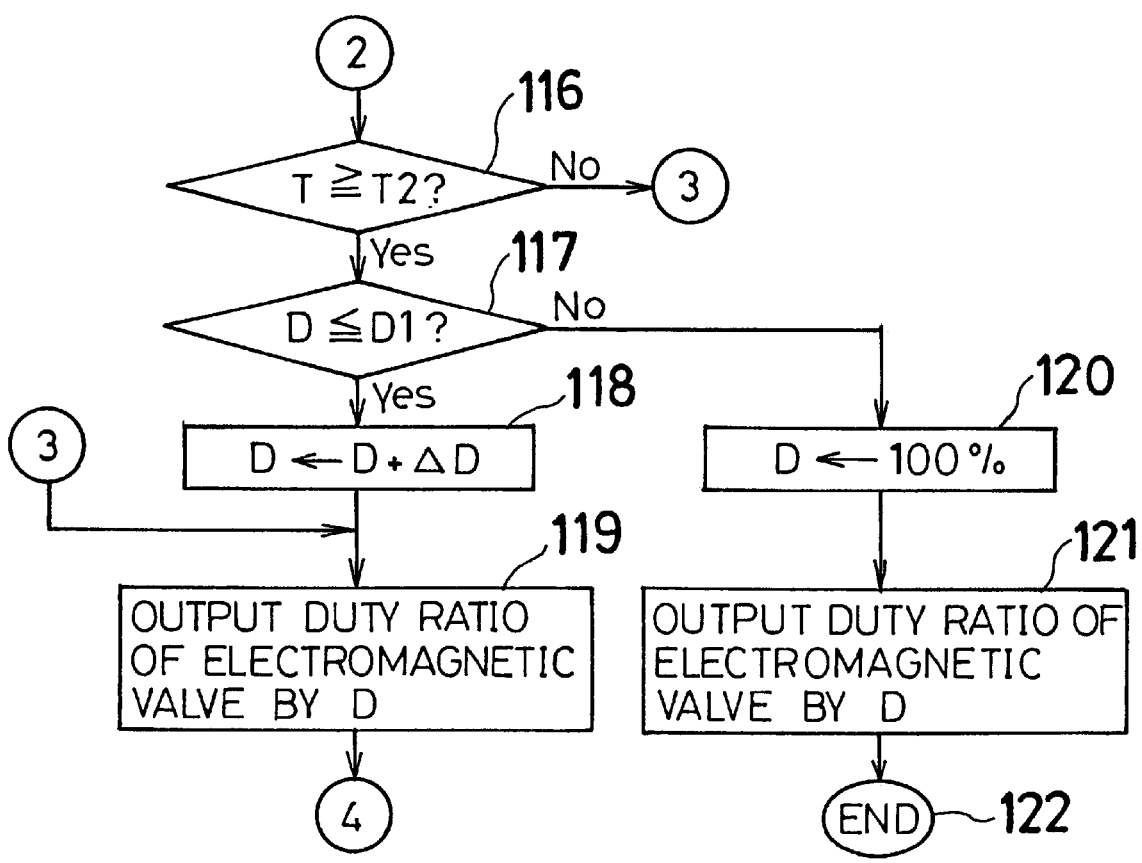
FIG. 5 is a flowchart showing the remaining part of the program executed by the electronic control unit shown in FIG. 1.
Figure 6:
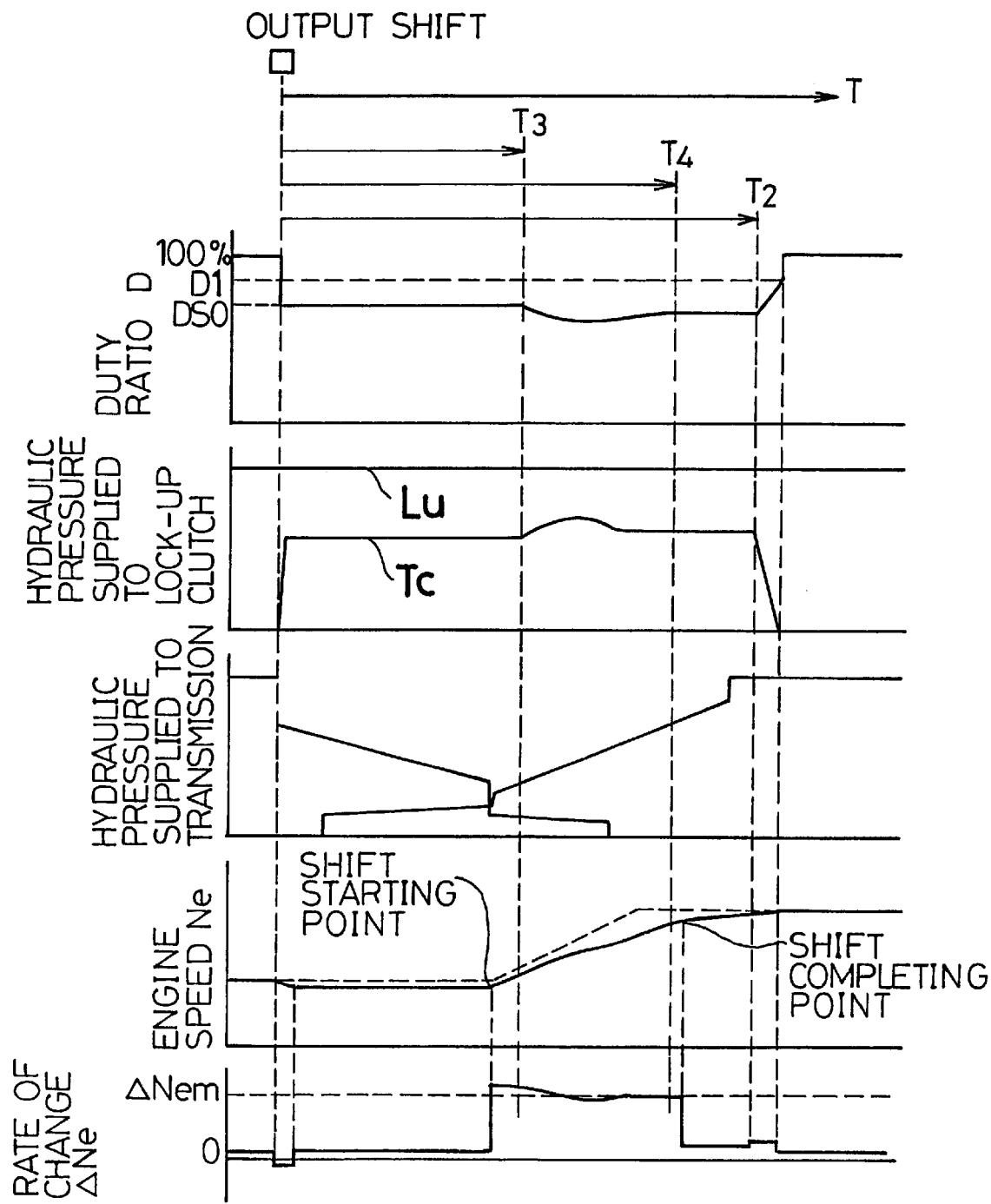
FIG. 6 is a timing chart explaining the operation of the first embodiment of the system shown in FIGS. 1–5.

When it is determined in Step 111 that the timer T is not less than or equal to T4, the process jumps to Step 116 in FIG. 5. The above-mentioned preset time T4 is decided such that the point of time of T4 comes before a shift completing point (when the shift-down from third to second is substantially completed and the engine speed is stabilized at high speed) based on actually measured values from the output of the shift to the shift completing point as shown in FIG. 6.

In Step 112, an actual rate of change of engine speed ΔNe is computed from a current engine speed Nen computed based on the output signal of the engine speed sensor 41 and an engine speed Nen-1 before tm sec. which has been stored in a memory. A deviation e is then computed in Step 113 from a target rate of change of engine speed ΔNem (selected corresponding to the number of revolutions No of the output shaft 22 detected by the output shaft speed sensor 42) stored in advance in the memory in the form of a map as shown in FIG. 7 and the actual rate of change of engine speed ΔNe computed by executing the process in Step 112. In Step 114, a duty ratio correcting value ΔDe is computed from the deviation e computed in Step 113 and an integration constant K1 of PI control. In Step 115, the duty ratio D is set at a value in which the duty ratio correcting value ΔDe computed by executing Step 114 is added to the current duty ratio D.

The program then proceeds to Step 116 shown in FIG. 5 where it is determined whether or not the measured value of the timer T (i.e., the elapsed time after the output of the shift) has reached a preset time T2. That is, a determination is made concerning whether the timer T is equal to or greater than T2. When the determination in Step 116 is "YES", Step 117 is executed and when the determination in Step 116 is "NO", the process jumps to Step 119. The above-mentioned preset time T2 is decided such that the point of time of T2 comes behind a point of time when the hydraulic pressure supplied to the hydraulic brake B1 has reached a preset value based on actually measured values from the output of the shift to the time when the shift is completed and the hydraulic pressure supplied to the hydraulic brake B1 is stabilized at the preset value as shown in FIG. 6.

In Step 117, it is determined whether or not the duty ratio D is less than a preset value D1, and when the determination is "YES", Steps 118 and 119 are executed. When the determination in Step 117 is "NO", Steps 120, 121 and 122 are executed. In Step 118, the duty ratio D is set to a value in which a predetermined duty ratio correcting value ΔD (a fixed value) is added to the current duty ratio D. A signal for setting the duty ratio of the electromagnetic valve 31 at D is outputted in Step 119. After the execution of Step 119 is completed, the process jumps to Step 105 in FIG. 3.

When the determination in Step 117 is that the duty ratio D is greater than a preset value D, the duty ratio D is set at 100% in Step 120, and a signal for setting the duty ratio of the electromagnetic valve 31 at D (100%) is outputted in Step 121. The execution of the program ends in Step 122.

Accordingly, during the time from the output of the shift to the preset time T3, Steps 101, 102, 103, 104, 105, 107, 108, 109, 110 and 119 are executed successively on the first time and Steps 105, 110 and 119 are executed successively at each time thereafter (i.e., on and after the second time). Then, the duty ratio of the electromagnetic valve 31 is held at the initial value DSO and the lock-up pressure Tc is held at the initial value. Therefore, the slip amount at the lock-up clutch L/U is maintained at the initial value.

Further, during the time from the preset time T3 to the preset time T4, steps 110, 111, 112, 113, 114, 115, 119 and 105 are executed successively on the first time and the same steps are executed successively each time thereafter (i.e., on and after the second time). Then, the duty ratio of the electromagnetic valve 31 a is PI-controlled and the lock-up pressure Tc is controlled in feedback so that the actual rate of change of the engine speed ΔNe approaches the target rate of change of engine speed ΔNem. Therefore, the slip amount at the lock-up clutch L/U is feedback controlled.

During the time from the preset time T4 to the preset time T2, Steps 111, 116, 119, 105 and 110 are executed successively on the first time and the same steps are executed each time thereafter (i.e., on and after the second time). Then, the duty ratio of the electromagnetic valve 31 is held at the final value of the PI control and the lock-up pressure Tc is held at a value maintaining the actual rate of change of engine speed ΔNe at the target rate of change of engine speed ΔNem. Therefore, the slip amount at the lock-up clutch L/U is maintained at the final value at the time of the feedback control.

On and after the preset time T2, Steps 117, 118, 119, 105, 110, 111 and 116 are executed successively until such time as the duty ratio becomes D1, and when the duty ratio exceeds D1 Steps 117, 120, 121 and 122 are executed. Then, the duty ratio of the electromagnetic valve 31 is set at 100% after increasing proportionally up to the preset value D1.

Accordingly, the lock-up pressure Tc is held at the drain pressure (low pressure) after having been proportionally reduced. Due to this, the slip amount at the lock-up clutch L/U gradually decreases and is maintained at the minimum value (completely engaged state where it is almost zero). It is noted that the execution of the program ends when Step 122 is executed.

As is apparent from the above description, according to the embodiment explained above with reference to FIGS. 1–7, the slip amount of the lock-up clutch L/U is controlled in feedback so that the rate of change of the actual engine speed Ne (i.e., the actual rate of change of the engine speed ΔNe) approaches the target rate of change of engine speed ΔNem during the predetermined time (during the preset time T3 to the preset time T4) from the shift starting point to the shift completing point of the transmission 20. This feedback control suppresses the blow-up of the engine and an occurrence of a shift shock in shifting the transmission 20 precisely even if the lock-up clutch L/U slips excessively or slips insufficiently after the shift starting point of the transmission 20 due to variation of the performance of the lock-up clutch itself or the variation of the use conditions. That is because the slip amount of the lock-up clutch L/U is corrected by the feedback control. It is noted that although the PI control has been adopted to cause the actual rate of change of the engine speed ΔNe to approach the target rate of change of engine speed ΔNem in the embodiment described above, it may be embodied by adopting PID control.

Figure 8:
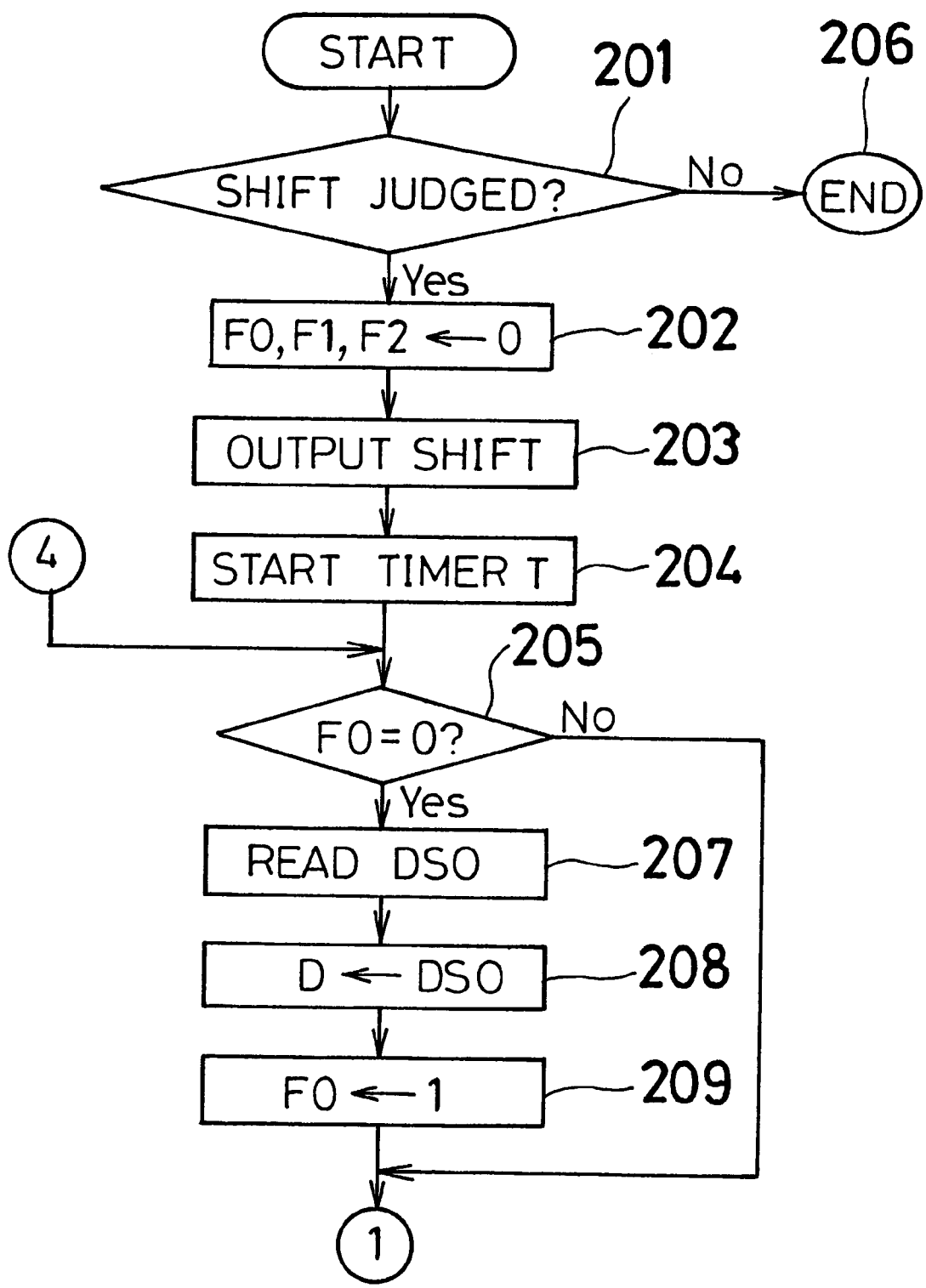
FIG. 8 is a flowchart showing a part of a program executed by the electronic control unit in accordance with a second embodiment of the present invention.
Figure 9:
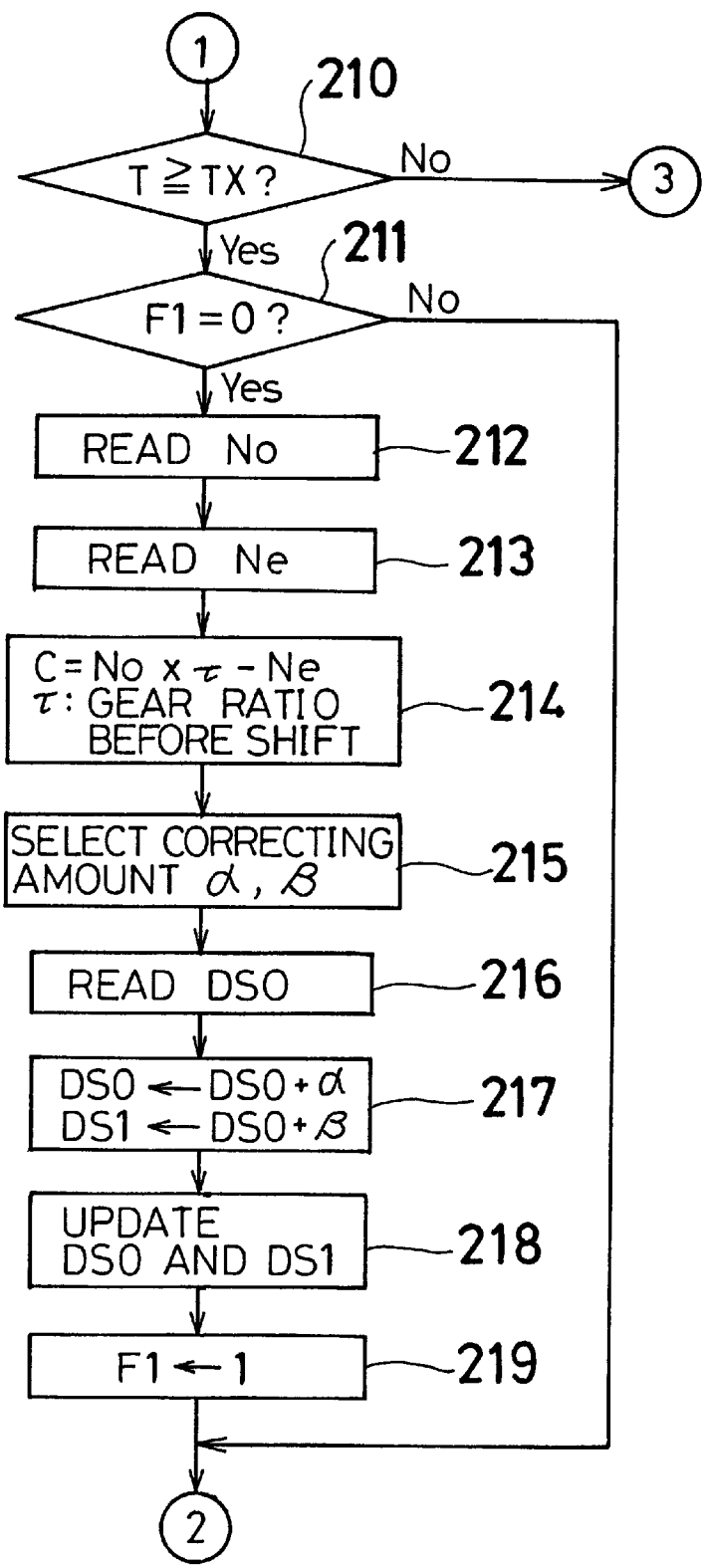
FIG. 9 is a flowchart showing another part of the program executed by the electronic control unit.
Figure 10:
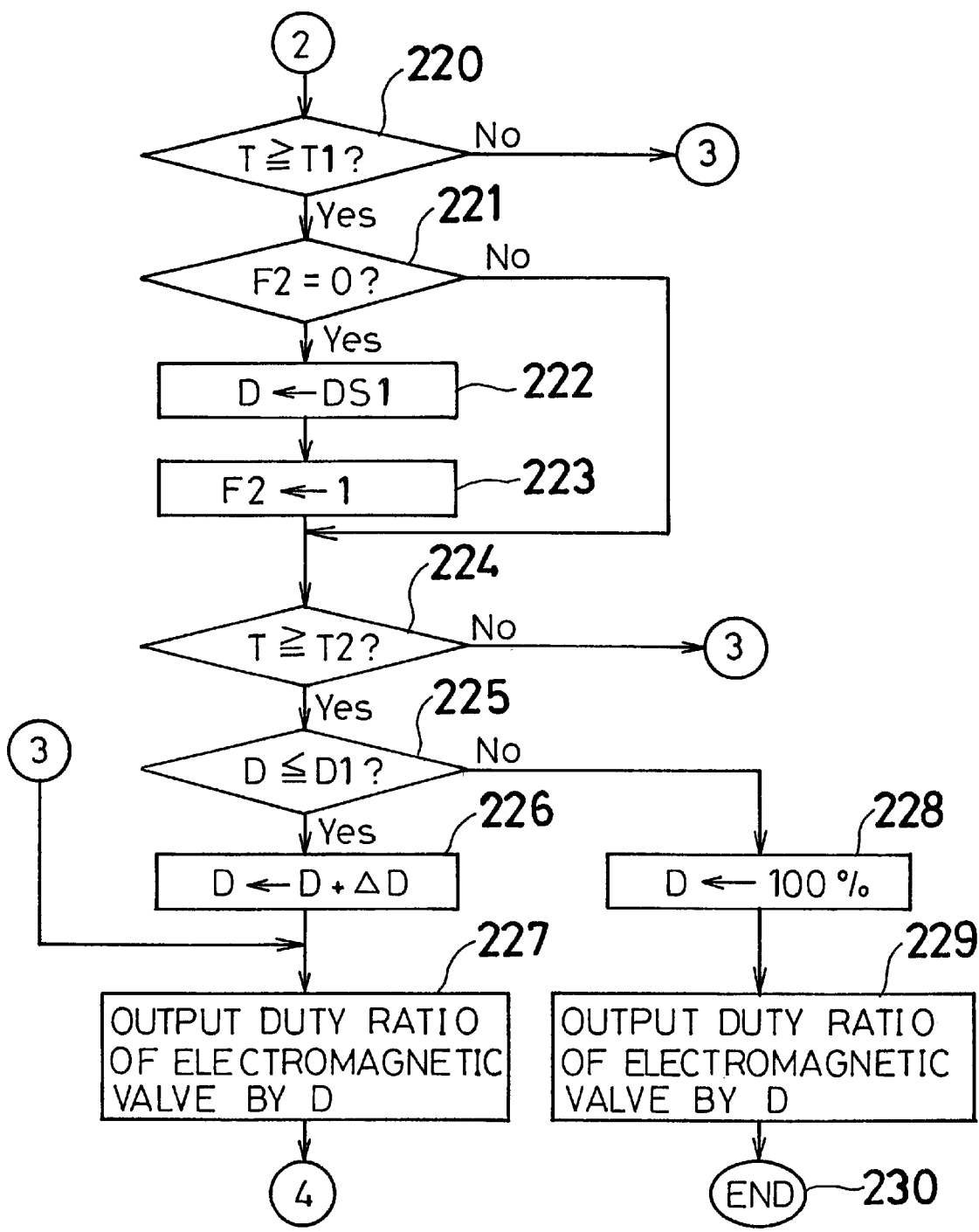
FIG. 10 is a flowchart showing the remaining part of the program executed by the electronic control unit.

Although the slip amount of the lock-up clutch L/U is been controlled in feedback so that the actual rate of change of the engine speed approaches the targeted rate of change in the predetermined time from the shift starting point to the shift completing point of the transmission 20 by executing the program corresponding to the flowcharts in FIGS. 3–5 in the embodiment described above, it is possible to set the slip amount of the lock-up clutch L/U before the shift starting point of the transmission 20 to be smaller than the slip amount of the lock-up clutch L/U after the shift starting point of the transmission 20, and to embody this so as to learn and correct both slip amounts corresponding to the performance of the lock-up clutch L/U before the shift starting point of the transmission 20 by executing a program corresponding to the flowcharts shown in FIGS. 8–10.

Figure 11:
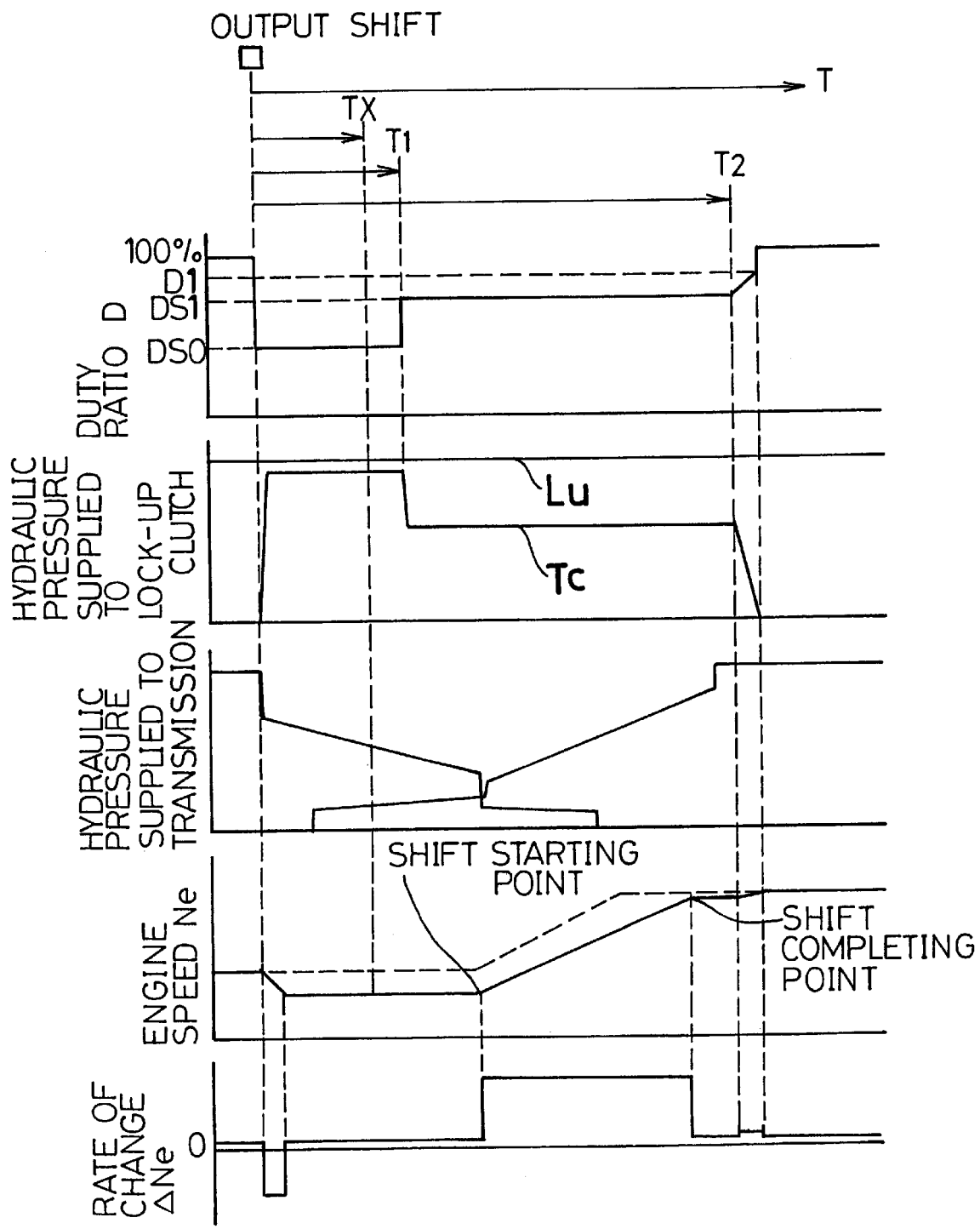
FIG. 11 is a timing chart explaining the operations of the second embodiment of the present invention shown in FIGS. 8–10.

Another operation of the lock-up clutch L/U in shifting the transmission 20 (e.g., in shifting down from the third speed to the second speed) when the lock-up clutch L/U contained in the torque converter 10 is directly coupled is explained below as a second embodiment, referring to the flowcharts shown in FIGS. 8–10 and the timing chart of FIG. 11. In the timing chart of FIG. 11, a characteristic curve indicated by a broken line in the graph of engine speed Ne represents when the duty ratio is 100% and the rate of slip of the torque converter is 1. In Step 201 of FIG. 8, a decision is made concerning whether or not a shift should be made and when it is determined to be "YES", Steps 202, 203, 204 and 205 are executed successively. When it is determined to be "NO" in Step 201, Step 206 is executed to end the execution of the program.

Flags F0, F1 and F2 are each set at "0" in Step 202, and the shift is then outputted in Step 203 (e.g., a shift-down signal from third to second is outputted). In Step 204, the timer T starts to count time in Step 204 and then it is decided in Step 205 whether or not the flag F0=0. When the determination in Step 205 is "YES", Steps 207, 208 and 209 in FIG. 8 and Step 210 in FIG. 9 are executed successively. When it is determined to be "NO" in Step 205, the process jumps to and executes Step 210 in FIG. 9.

An initial value DSO of the duty ratio stored in advance is read in Step 207, the duty ratio D is set at the initial value DSO in Step 208, and the flag F0 is set at "1" in Step 209. It is then decided in Step 210 whether or not a measured value of the timer T (i.e., an elapsed time after the output of the shift) has reached a preset value TX. That is, it is determined whether or not the measured value of the timer T is greater than or equal to TX. When the determination in Step 210 is "YES", Step 211 is executed and when it is determined to be "NO" in Step 210, the process jumps to and executes Step 227 in FIG. 10. The above-mentioned preset time TX is decided such that the point of time of TX comes before a shift starting point based on actually measured values from the output of the shift to the time of the shift starting point (when the engine speed starts to increase by shifting down from third to second) as shown in FIG. 11.

In Step 211, it is determined whether or not the flag F1=0. When it is determined to be "YES" in Step 211, Steps 212, 213, 214, 215, 216, 217, 218 and 219 in FIG. 9 and Step 220 in FIG. 10 are executed successively. When it is determined to be "NO" in Step 211, the process jumps to and executes Step 220 in FIG. 10.

An output shaft speed No computed based on the output signal of the output shaft speed sensor 42 is read in Step 212. An engine speed Ne computed based on the output signal of the engine speed sensor 41 is read in Step 213. The slip amount C of the lock-up clutch L/U is then computed in Step 214 from the output shaft speed No, the engine speed Ne and a gear ratio τ before shift. In Step 215, a correcting amount α or β stored in the memory in advance in the form of a map as shown in FIG. 12 is selected based on the slip amount C. The initial value DSO of the duty ratio is then read in Step 216. In Step 217, the initial value DSO of the duty ratio is set at a value in which the correcting amount α is added and the preset value DS1 of the duty ratio is set at a value in which the correcting amount β is added to the initial value DSO. The initial value DSO and the preset value DS1 of the duty ratio are updated and stored, respectively, in Step 218, and then the flag F1 is set at "1" in Step 219.

In Step 220 shown in FIG. 20, a determination is made concerning whether or not the measured value of the timer T (i.e., the elapsed time after the output of the shift) has reached a preset time TI (i.e., whether or not T is greater than or equal to T1). When it is determined to be "YES" in Step 220, Step 221 is executed and when it is determined to be "NO" in Step 220, the program jumps to and executes Step 227. The above-mentioned preset time T1 is decided such that the point of time of TI comes before the shift starting point and behind the point of time TX based on actually measured values from the output of the shift to the shift starting point (when the engine speed starts to increase due to the shift-down from third to second) as shown in FIG. 11.

It is then determined in Step 221 whether or not the flag F2=0. When it is determined to be "YES" in Step 221, Steps 222, 223 and 224 are executed successively and when it is determined to be "NO" in Step 211, the process jumps to and executes Step 224. in Step 222, the duty ratio D is set at the value DS1 computed in Step 217. The flag F2 is then set at "1" in Step 223.

The program then proceeds to Step 224 where it is determined whether or not the measured value of the timer T (i.e., the elapsed time after the output of the shift) has reached a preset time T2. That is, a determination is made concerning whether or not the value of the timer T is greater than or equal to T2). When it is determined to be "YES" in Step 224, Step 225 is executed and when it is determined to be "NO" in Step 224, the process jumps to and executes Step 227. The above-mentioned preset time T2 is decided such that the point of time T2 comes behind a point of time when the hydraulic pressure supplied to the hydraulic brake B1 has reached a preset value based on actually measured values from the output of the shift to the time when the shift is completed and the hydraulic pressure supplied to the hydraulic brake Bl is stabilized at the preset value as shown in FIG. 11.

After executing Step 224, the program proceeds to step 225 where it is determined whether or not the duty ratio D is less than the preset value D1. When it is determined to be "YES" in Step 225, Steps 226 and 227 are executed, and when it is determined to be "No" in Step 225, Steps 228, 229 and 230 are executed.

In Step 226, the duty ratio D is set at a value in which a predetermined duty ratio correcting value ΔD (a fixed value) is added, and then a signal for setting the duty ratio of the electromagnetic valve 31 at D is outputted in Step 227. It is noted that after executing Step 227, the process jumps to Step 205 in FIG. 8 to execute Step 205.

If the determination at Step 224 is "NO", the duty ratio D is set at 100% in Step 228. A signal for setting the duty ratio of the electromagnetic valve 31 at D (100%) is subsequently outputted in Step 229. The execution of the program ends in Step 230.

Accordingly, during the time from the output of the shift to the preset time TX, Steps 201, 202, 203, 204, 205, 207, 208, 209, 210 and 227 are executed successively on the first time, and Steps 205, 210, 227 and 205 are executed successively at each subsequent time (i.e., on and after the second time). Then, the duty ratio of the electromagnetic valve 31 is held at the initial value DSO and the lock-up pressure Tc is held at the initial value. Therefore, the slip amount at the lock-up clutch L/U is maintained at the preset value.

Further, during the time from the preset time TX to the preset time T1, Steps 210, 211, 212, 213, 214, 215, 216, 217, 218, 219, 220, 227 and 205 are executed successively on the first time and Steps 210, 211, 220, 227 and 205 are executed successively each time thereafter (i.e., on and after the second time). Then, the duty ratio of the electromagnetic valve 31 is held at the initial value DSO (the value read in Step 207) which is the same until the preset time TX and the lock-up pressure Tc is held at the initial value, even though the values DS0 and DS1 stored in the memory are updated and stored. Therefore, the slip amount at the lock-up clutch L/U is maintained at the preset value corresponding to the value DSO.

During the time from the preset time T1 to the preset time T2, Steps 220, 221, 222, 223, 224, 227, 205, 210 and 211 are executed successively on the first time and Steps 220, 221, 224, 227, 205, 210 and 211 are executed successively each time thereafter (i.e., on and after the second time). Then, the duty ratio of the electromagnetic valve 31 is held at the preset value DS1 (the value updated and stored in Step 218) and the lock-up pressure Tc is held at the preset value. Therefore, the slip amount at the lock-up clutch L/U is maintained at the preset value corresponding to the value DS1.

After the preset time T2, Steps 225, 226, 227, 205, 210, 211, 220, 221 and 224 are executed successively until when the duty ratio becomes D1. When the duty ratio exceeds D1, Steps 225, 228, 229 and 230 are executed. Then, the duty ratio of the electromagnetic valve 31 is set at 100% after increasing proportionally up to the preset value D1. Accordingly, the lock-up pressure Tc is held at drain pressure (low pressure) after having been proportionally reduced. Due to that, the slip amount at the lock-up clutch L/U gradually decreases and is maintained at the minimum value. It is noted that the execution of the program ends when Step 230 is executed.

As is apparent from the above description, the embodiment explained above with reference to FIGS. 8–12 is arranged so as to set the slip amount (the amount corresponding to DSO of the duty ratio) of the lock-up clutch L/U before the shift starting point of the transmission 20 to be smaller than the slip amount of the lock-up clutch L/U after the shift starting point of the transmission 20, and to learn and correct both slip amounts corresponding to the slip performance of the lock-up clutch L/U before the shift starting point of the transmission 20. This allows suppression of blow-up of the engine and the occurrence of a shift shock in shifting the transmission 20 precisely even if the lock-up clutch L/U slips excessively or slips insufficiently after the shift starting point of the transmission 20 due to variations in the performance of the lock-up clutch itself or to variations in the use conditions. This is because the trouble caused by excessive slip or insufficient slip is improved every time when the transmission 20 is shifted because the slip amount (DS1) of the lock-up clutch L/U after the shift starting point of the transmission 20 is corrected and the slip amount (DSO) of the lock-up clutch before the next shift starting point of the transmission 20 is corrected.

Although the duty ratio D between the preset times T1 and T2 has been held at the preset value DS1 in the embodiment described above with reference to FIGS. 8–12, it is possible to arrange it, with respect to the duty ratio D during this time, so as to feedback control the slip amount of the lock-up clutch L/u such that the rate of change of the actual engine speed Ne (i.e., the actual rate of change of the engine speed ΔNe) approaches the target rate of change of engine speed ΔNem in the predetermined time (during the time from the preset time T3 to the preset time T4) from the shift starting point to the shift completing point of the transmission 20 in the same manner as the embodiment described above with reference to FIGS. 1–7.

A still further operation of the lock-up clutch L/U in shifting the transmission 20 (e.g., in shifting down from the third speed to the second speed) when the lock-up clutch L/U contained in the torque converter 10 is directly coupled is explained below with respect to a third embodiment illustrated in the flowcharts of FIGS. 13–16 and the timing chart shown in FIG. 17.

Figure 13:
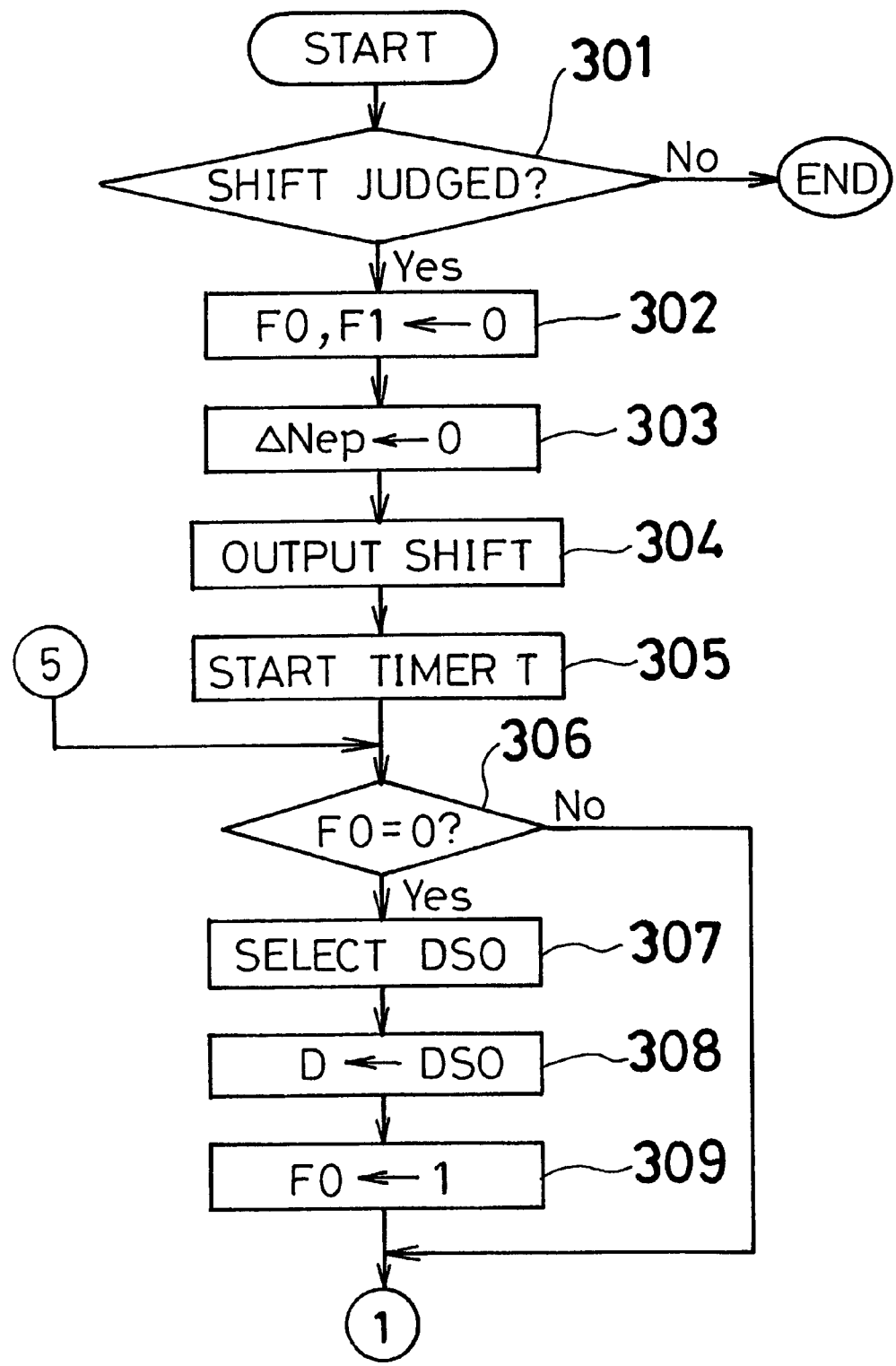
FIG. 13 is a flowchart showing a part of a program executed by the electronic control unit in accordance with a third embodiment of the present invention.

As seen in FIG. 13, when the control is started, it is first judged in Step 301 whether or not the shift has to be made. When the shift has to be made, flags F0 and F1 are cleared in Step 302. The flag F0 indicates whether or not the duty ratio DSO stored in the ECU has been selected and the flag F1 indicates whether or not the map of the duty ratio DSO has been corrected. Next, the maximum value ΔNep of the rate of change of the engine speed ΔNe is cleared in Step 303. In Step 304, the shift that has been determined in Step 301 is outputted. Then, in Step 305, the timer T is started at the same time with the output of the shift in Step 304. In Step 306, it is judged whether or not the flag F0 is 0 (i.e., whether the duty ratio DSO has not been selected). If the determination in Step 306 is "YES", the duty ratio DSO is selected in Step 307, the DSO is set as the duty ratio D to be outputted to the electromagnetic valve in Step 308, and the flag F1 is set to 1 in Step 309.

Figure 14:
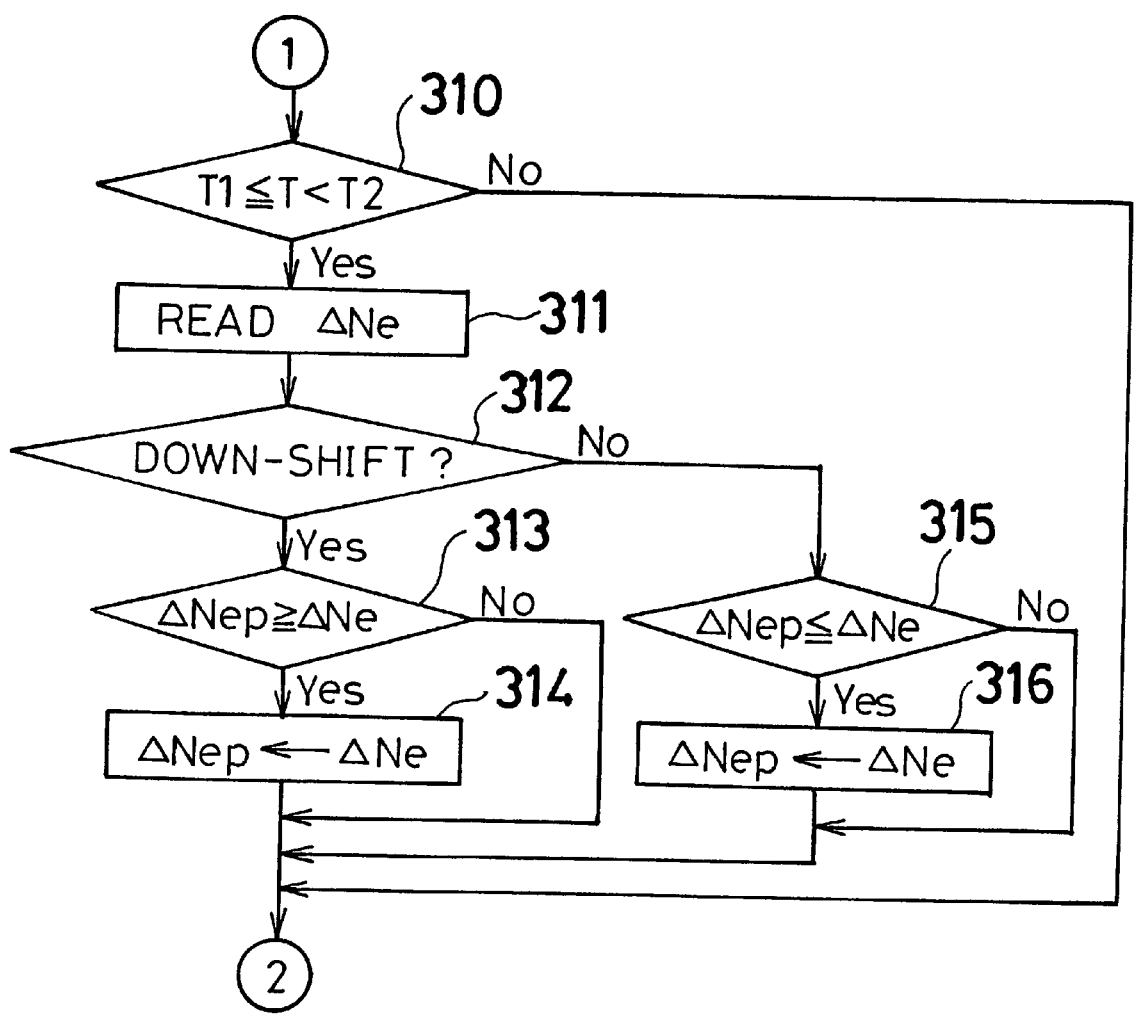
FIG. 14 is a flowchart showing the program continued from FIG. 13.

Next, the process advances to Steps 310–316 in FIG. 14. It is determined in Step 310 whether or not a time T from the output of the shift satisfies the relationship T1≦T<T2. When TI≦T<T2 is satisfied, the rate of change of engine speed ΔNe is read in Step 311. It is then determined in Step 312 whether or not the shift is the down-shift. If it is the down-shift, it is judged in Step 313 whether the value ΔNep is greater than or equal to ΔNe, and if so the rising side of the rate of change of the engine speed ΔNe (i.e., the maximum value of a positive value) is set as ΔNep at Step 314. If the determination in Step 313 is "NO", Step 314 is skipped. If it is determined in Step 312 to not be the downshift, it is judged in Step 315 whether the value ΔNep is less than or equal to ΔNe, and if so the down side of the rate of change of engine speed ΔNe (i.e., the maximum value of a negative value) is set as ΔNep in Step 316. If the determination in Step 315 is "NO", Step 316 is skipped. When T1>T right after when the shift was outputted in Step 310, the duty ratio D outputted in the previous shift is outputted to the electromagnetic valve.

Figure 15:
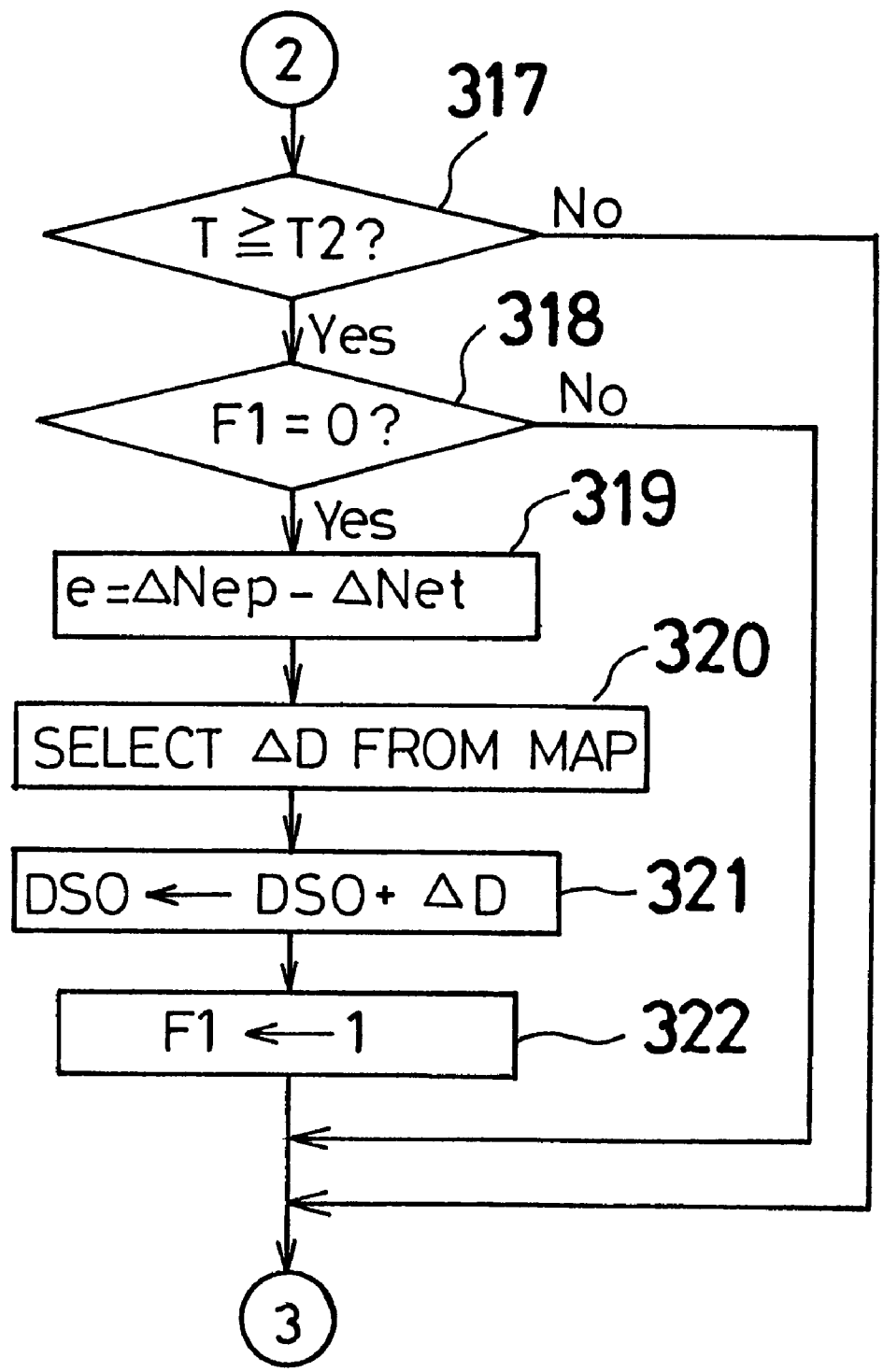
FIG. 15 is a flowchart showing the program continued from FIG. 14.

The process then advances to Steps 317–322 in FIG. 15. In Step 317, it is judged whether or not the time from the output of the shift is greater than or equal to a predetermined time T2 (>T1). When the time from the output of the shift is greater than or equal to the predetermined time T2, it is determined in Step 318 whether or not the flag F1 is 0. When the flag F1 is 0, the process advances to Step 319 to compute a deviation between the peak value of the rate of change of the engine speed ΔNep found in Steps 312–316 and a target rate of change ΔNet. Then in Step 320, a deviation amount ΔD of the duty ratio to be outputted to the electromagnetic valve is selected from the map based on the deviation e. The deviation amount ΔD is added to the duty ratio DSO in Step 321 and then the flag F1 is set at 1 in Step 322.

Figure 16:
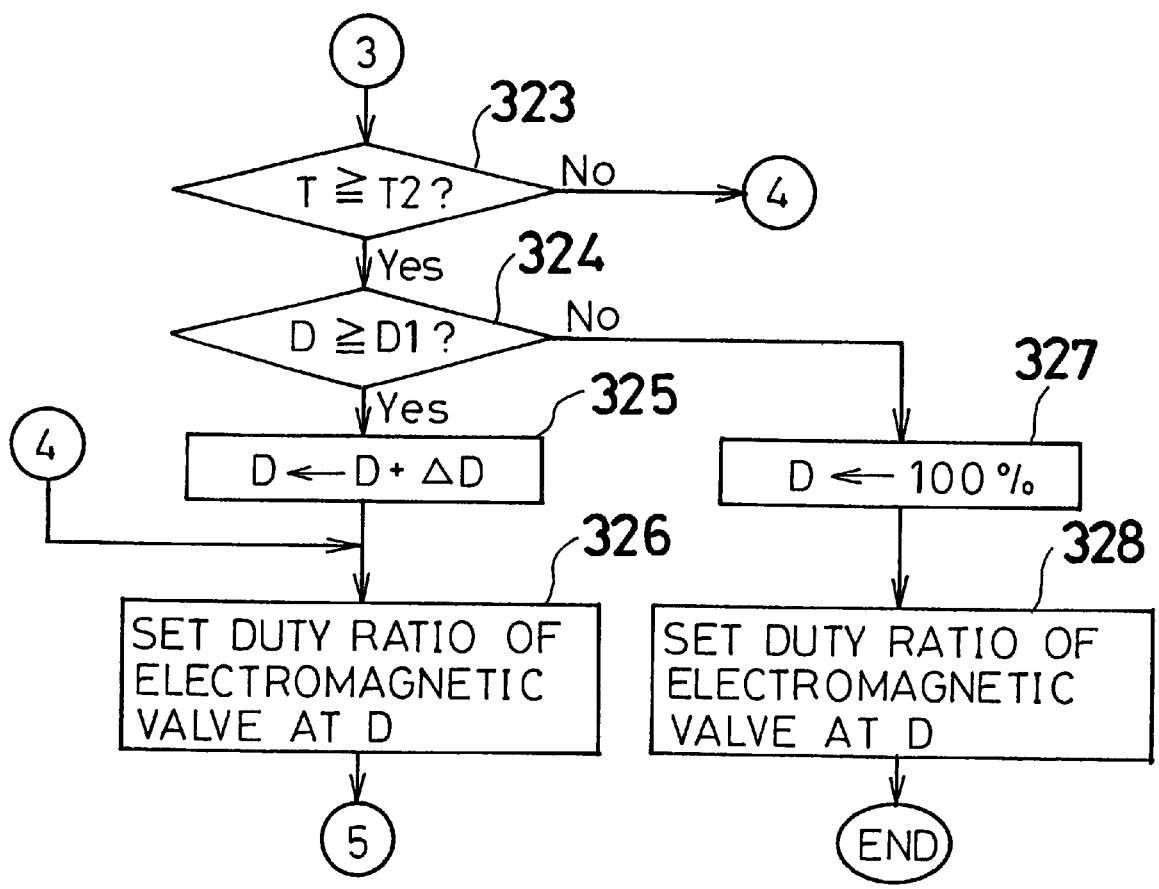
FIG. 16 is a flowchart showing the program continued from FIG. 15.

Next, the process advances to Steps 323–328 shown in FIG. 16. It is once again determined in Step 323 whether or not the time T from the output of the shift is greater than the predetermined time T2. When the time T is greater than the predetermined time T2, it is judged in Step 324 whether or not the duty ratio D to be outputted to the electromagnetic valve is greater than or equal to D1. When the duty ratio D is less than D1, the deviation amount ΔD is added to the duty ratio D in Step 325 to gradually increase the duty ratio D. When the duty ratio D is found to be greater than or equal to D1 in Step 324, the duty ratio D is set at 100% in Step 327. Then, the duty ratio D is outputted to the electromagnetic valve in Steps 326 and 328, respectively.

Figure 17:
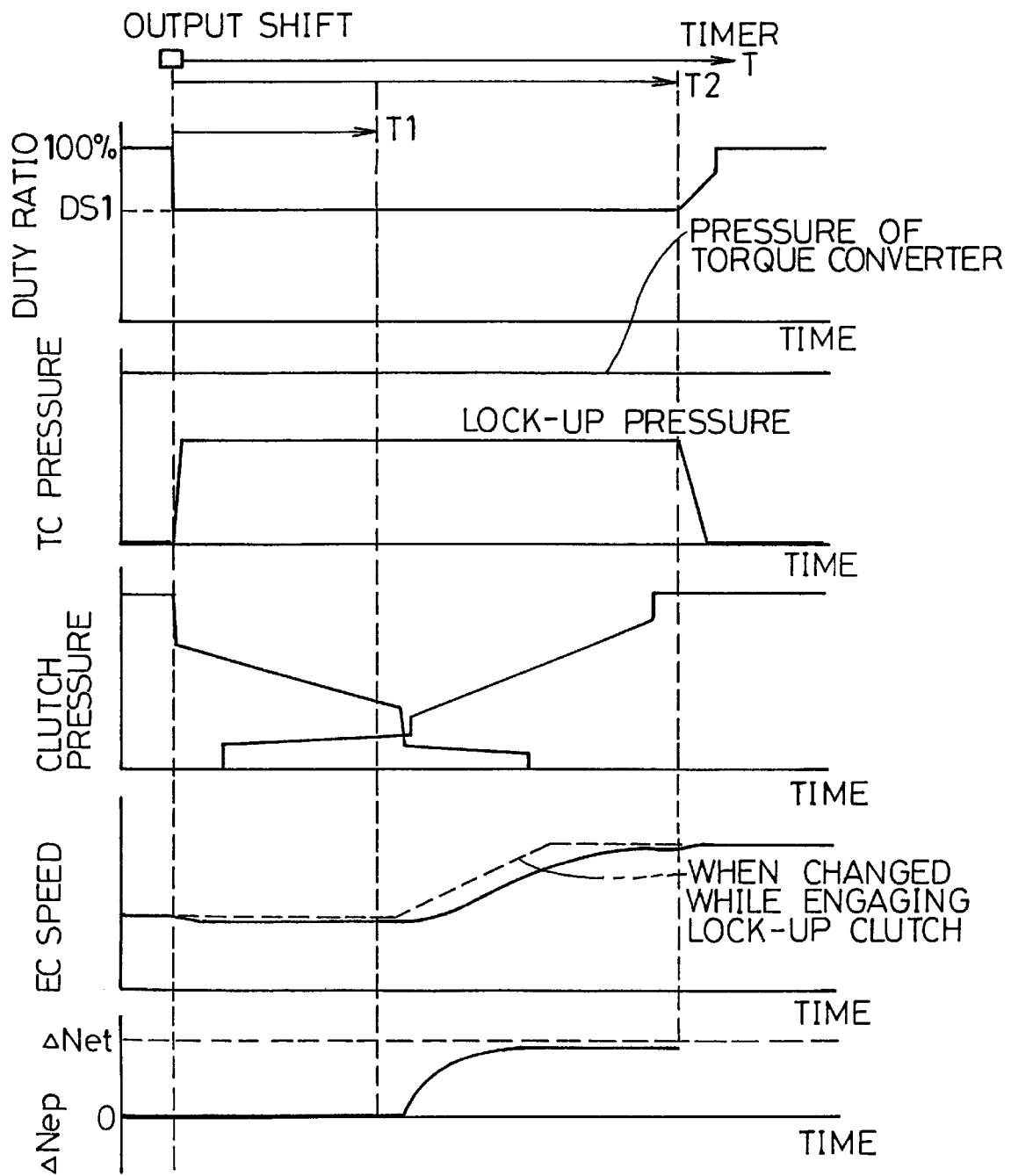
FIG. 17 is a timing chart explaining the operations of the third embodiment of the present invention.

FIG. 17 is a timing chart during shifting from third to second as described above. The predetermined time T1 in the control flow is the time right before when the engine speed starts to increase from the output of the shift, and the predetermined time T2 is a time until when the engagement of the lock-up clutch and the shift are completed from the output of the shift. Accordingly, the peak value ΔNep found in Steps 310–316 is read only within the range between the predetermined times TI through T2.

The target rate of change ΔNet in step 319 in the above-mentioned control flow is found from the map based on the number of revolutions No of the output shaft in outputting the shift as shown in FIG. 18. It is noted that FIG. 18 shows the target rate of change ΔNet in down-shifting from third to second.

The duty ratio correcting amount ΔD may be found from the map based on the number of revolutions No of the output shaft and the deviation e in outputting the shift as shown in FIG. 19. It is noted that FIG. 19 shows the duty ratio correcting amounts ΔD in down-shifting from third to second.

Although the lock-up control of the automatic transmission has been described specifically with reference to the shift control from third to second in the embodiment shown in FIGS. 13–19, the present invention is not intended to be limited specifically to such control and a similar lock-up clutch control can be achieved along the above-mentioned control flow in up-shifting the transmission, beside down-shifting, and in shifting the transmission other than in the case of a shift from third to second.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A lock-up control method of an automatic transmission in which a fastening force of a lock-up clutch contained in a torque converter is temporarily dropped to cause the lock-up clutch to slip in shifting the automatic transmission when said lock-up clutch is directly coupled, comprising correcting the fastening force of said lock-up clutch so that a rate of change of engine speed in shifting said transmission is changed to a desired rate of change of engine speed.

2. The lock-up control method of the automatic transmission according to claim 1, wherein said fastening force of said lock-up clutch is determined by a value of duty ratio outputted to an electromagnetic valve for controlling the supply of hydraulic pressure to said lock-up clutch.

3. The lock-up control method of the automatic transmission according to claim 2, wherein said desired rate of change of engine speed is attained by determining a maximum value of the rate of change of engine speed while shifting said transmission, correcting the fastening force of said lock-up clutch so that a deviation between said maximum value and a maximum rate of change of a target engine speed is zeroed, and fastening said lock-up clutch in a following shift using the fastening force that has been corrected.

4. The lock-up control method of the automatic transmission according to claim 2, wherein said desired rate of change of engine speed is attained by feedback controlling a slip amount of said lock-up clutch so that an actual rate of change of engine speed approaches a target rate of change during a predetermined time from a shift starting point to a shift completing point of said transmission.

5. The lock-up control method of the automatic transmission according to claim 2, wherein said lock-up clutch is arranged to set one slip amount of said lock-up clutch before a shift starting point of said transmission to be smaller than another slip amount of said lock-up clutch after the shift starting point of said transmission, and to correct said one and another slip amounts corresponding to a slip performance of said lock-up clutch before the shift starting point of said transmission.

* * * * *